United States Patent
Toyama et al.

(10) Patent No.: US 7,489,817 B2
(45) Date of Patent: *Feb. 10, 2009

(54) BACKGROUND MAINTENANCE OF AN IMAGE SEQUENCE

(75) Inventors: Kentaro Toyama, Redmond, WA (US); John C. Krumm, Redmond, WA (US); Barry L. Brumitt, Redmond, WA (US); Brian R. Meyers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

This patent is subject to a terminal disclaimer.

(21) Appl. No.: 11/255,447

(22) Filed: Oct. 22, 2005

(65) Prior Publication Data

US 2006/0034519 A1 Feb. 16, 2006

Related U.S. Application Data

(62) Division of application No. 09/400,346, filed on Sep. 20, 1999, now Pat. No. 7,136,525.

(51) Int. Cl.
- *G06K 9/34* (2006.01)
- *G06K 9/46* (2006.01)
- *G06K 9/66* (2006.01)

(52) U.S. Cl. .................. 382/173; 382/190; 382/194
(58) Field of Classification Search ............... 382/173, 382/190, 194, 199; 345/629, 611, 612, 630, 345/636, 641
See application file for complete search history.

(56) References Cited

U.S. PATENT DOCUMENTS

| | | | | |
|---|---|---|---|---|
| 5,287,200 | A * | 2/1994 | Sullivan et al. | 382/251 |
| 6,335,985 | B1 * | 1/2002 | Sambonsugi et al. | 382/190 |

* cited by examiner

*Primary Examiner*—Brian Q Le
(74) *Attorney, Agent, or Firm*—Lyon & Harr, L.L.P.; Craig S. Fischer

(57) ABSTRACT

An image background maintenance system and method for maintaining a background model of an image sequence by processing on multiple spatial scales. These multiple spatial scales include a pixel scale, a regional scale and a frame scale. The image sequence undergoes pixel processing that determines a current background model and provides an initial pixel assignment as either a background or a foreground pixel. Region processing further refines the initial pixel assignments by considering relationships between pixels and possibly reassigning pixels. Frame processing further refines the current background model by determining whether a substantial change has occurred in the actual background and, if so, providing a more accurate background model.

19 Claims, 12 Drawing Sheets

BACKGROUND MAINTENANCE OF AN IMAGE SEQUENCE

CROSS REFERENCE TO RELATED APPLICATIONS

This application is a divisional application of U.S. patent application Ser. No. 09/400,346, entitled "System and Method for Background Maintenance of an Image Sequence," filed Sep. 20, 1999, which is now pending, the entire contents of which are hereby incorporated by reference.

BACKGROUND

Computer vision systems are used to automatically identify and interpret occurrences in a variety of environments. These occurrences may be people, objects or events that are identified by the system as noteworthy and likely candidates for further interpretation and understanding. One common use of computer vision systems is in video surveillance systems, which are generally used to automatically monitor and identify occurrences in, for example, offices, rooms and parking lots. These video surveillance systems usually contain a camera, directed at an area of interest, and a computer vision system that receives and processes a sequence of images from the camera and notifies human operators or other systems of important occurrences.

One important element of these computer vision systems is a background maintenance module that processes the image sequence and maintains a suitable background model throughout the sequence. In general, the image sequence contains several frames and each frame (a single image that is a collection of individual pixels) is divided into a background, which contains mostly irrelevant details of the frame, and a foreground, which contains significant details and occurrences within the frame. Further, the current frame being processed is known as the input frame. The background model is some representation of the background and its associated statistics based on properties of the individual pixels. These pixel properties may include, for example, pixel intensity, pixel color and associated statistical properties (such as mean and variance). Background maintenance is maintaining a suitable background model that provides a reasonably accurate representation of the background so that the background and the foreground can be distinguished in each frame of the image sequence.

Maintenance of the background model is important because the model indicates what the expected background should be so the actual background is not marked for further high-level processing (such as interpretation and understanding). Because high-level processing is costly and requires valuable system resources, unnecessarily processing background regions of the image can severely impair the performance of a computer vision system.

Background maintenance includes a background model that has properly defined stationarity and appropriate adaptation. Stationarity is a statistical pixel property of the background pixels that a particular background model assumes to be consistent from frame to frame. This statistical pixel property may include, for example, pixel intensity and pixel color. An object in a frame is classified as foreground (and may be further processed) if a statistical pixel property significantly varies from this consistent (or expected) value. Stationarity, however, does not mean the absence of motion, and for optimum performance a background maintenance system should be capable of handling movement in the background. For example, assume that a particular background model defines stationarity as a pixel intensity and a background in an image sequence contains a fluttering leaf on a tree. As each frame in the image sequence is processed the leaf will move on and off a certain pixel in each frame thereby radically changing the intensity of that pixel from frame to frame. In order to provide proper background maintenance, the stationarity of the background model should be defined to accommodate a range of intensity values that are wide enough to prevent the leaf from constantly being classified as foreground and yet narrow enough to properly capture foreground objects that may appear.

Adaptation is the ability of a background maintenance system to adapt to both sudden and gradual changes in the background. When these changes occur, the current background model being used by the system may become unsuitable because the background model may either be lacking the entire background or including some of the foreground. An adaptive background maintenance system is able to produce a new background model that includes the changed background. Further, an adaptive background maintenance system is able to incorporate into the new background model those objects that are initially classified as foreground but that regain stationarity. For example, suppose that an image sequence contains a chair that is part of a background. If the chair is nudged or otherwise momentarily set into motion the background maintenance system may initially classify the chair as foreground, even though in reality it is part of the background. Once the chair comes to rest the pixels representing the chair regain statistical stationarity. An adaptive background maintenance system would reclassify the still chair as background instead of permanently classifying the chair as foreground.

Most background maintenance systems process individual pixels independent of other pixels. The capability of this pixel processing, however, is limited and certain types of foreground objects can be missed. For example, when a homogeneously colored foreground object moves, pixel processing may not include the entire foreground object as foreground because the pixel processing cannot detect change in the interior pixels of the object. This is because pixel processing looks at isolated pixels and does not evaluate the neighboring sets of pixels. These systems cannot properly account for large changes because such a change occurs on a regional scale and not merely on an individual pixel scale. In order to achieve accurate, efficient and adaptive background maintenance processing of the image sequence should occur on a regional scale using relationships between pixels.

In some cases background changes may be significant and widespread. For example, sudden changes in illumination (such as when lights are turned on in a dark room) may drastically change the objects seen in a frame and can require remodeling of the background. Most background maintenance systems, however, use pixel processing, whereby each individual pixel in a frame is considered as an independent entity (i.e. independent of other pixels). These types of systems will not recognize the need for a new background model and will assign all or most of the frame as foreground. These systems cannot properly account for such a global change because the change occurs on a frame-wide scale and not merely on an individual pixel scale. In order to achieve accurate, efficient and adaptive background maintenance these frame-wide changes should be accounted for by processing not just individual pixels but also the entire frame.

SUMMARY

To overcome the limitations in the prior art as described above and other limitations that will become apparent upon reading and understanding the present specification, the invention disclosed herein includes a system and a method for maintaining a background model of an image sequence by performing image processing on multiple spatial scales. The image background maintenance system and method provides accurate, efficient and adaptive background maintenance for computer vision systems.

In particular, the invention disclosed herein is especially well-suited for providing instantaneous background model adaptation to an image sequence undergoing substantial background changes. This is achieved by processing each frame of the image sequence on a plurality of spatial scales. The background maintenance module of the inputs an image sequence containing a plurality of frames, assigns each pixel within a frame as either a foreground or a background pixel and outputs a foreground image assembled from identified foreground pixels. The foreground pixels are identified by modeling the actual background using a background model and assigning all pixels that are not within the background model as foreground pixels.

The background maintenance module includes a pixel processing module for processing a frame on a pixel scale, a region processing module for processing the frame on a regional scale, and a frame processing module for processing the frame as a whole. In general, the pixel processing module considers individual pixels as independent entities and provides an initial pixel assignment of either foreground or background. The region processing module further refines the initial pixel processing assignments by considering relationships between pixels and appropriately segmenting entire groups of foreground pixels. The region processing module is particularly useful when a large number of pixels have been assigned as foreground pixels by the pixel processing module. Further, the frame processing module considers the entire frame and determines whether the actual background is adequately represented by the current background model assigned by the pixel processing module. The frame processing module is particularly beneficial when the actual background has undergone a large change (either sudden or gradual) such that the current background model is no longer an accurate model.

The invention disclosed herein also includes a method for maintaining background model of an image sequence. Processing on at least two spatial scales is used to provide accurate, efficient and instantaneous adaptation of the background model in response to changes in the actual background. In particular, processing on a pixel scale includes having at least two predictions of the current value of a pixel property using previous pixel values. Moreover, the prediction parameters associated with each prediction are updated for every new frame. This multiple predictor pixel processing provides accurate maintenance of the background model and prevents the background model from being corrupted if the background is briefly concealed by a foreground object.

Regional processing of a frame operates in connection with pixel processing and to find the moving foreground pixels in the frame. These pixels are used to determine a boundary of a foreground object and, by examining pixel properties between neighboring pixels, the boundary of the object is filled in to segment the entire foreground object from the background. Frame processing also operates in connection with pixel processing and updates a set of stored models of the background. A frame that has undergone initial processing on a pixel scale and has an associated current background model is processed to determine whether the current background model adequately represents the actual background. If the current background model is not sufficient, then the actual background is compared to all the stored models to determine which of the stored models is the best background model. The stored model that is the best background model is substituted for the current background model to become the new background model. In addition, the invention disclosed herein may be embodied in a computer-readable medium having several computer-executable modules for performing the functions described above.

Other aspects and advantages as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

DRAWINGS DESCRIPTION

Referring now to the drawings in which like reference numbers represent corresponding parts throughout:

DETAILED DESCRIPTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the invention disclosed herein.

Exemplary Operating Environment

Figure 1:
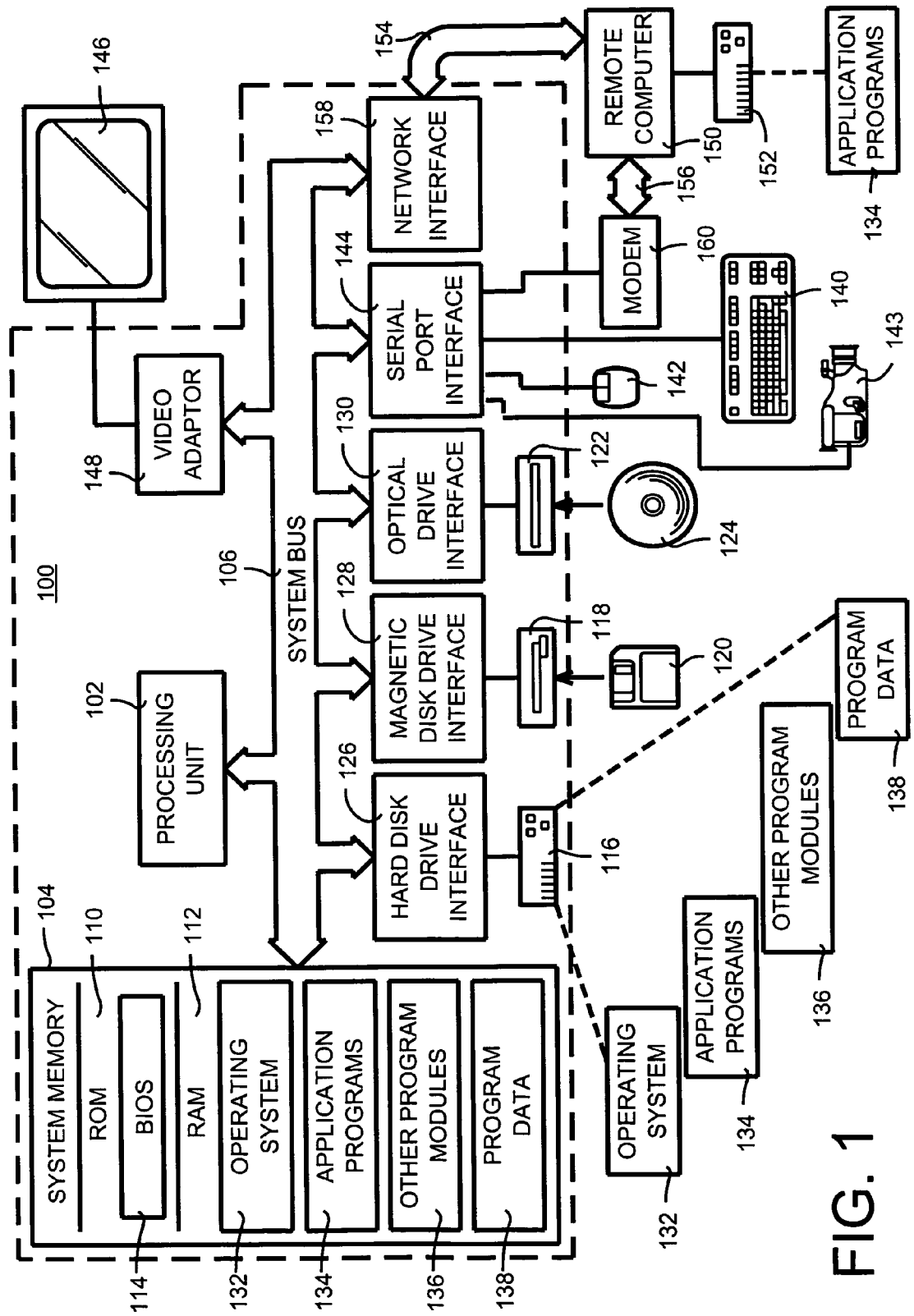
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system (BIOS) 114, containing the basic routines that help to transfer information between elements within the computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide storage of computer readable instructions, data structures, program modules and other data for the computer 100.

Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may include communication media and computer storage media. Communication media includes computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. As an example, and without limitation, communication media includes wired media such as wired network or direct wired connection, and wireless media such as acoustic, radio frequency (RF), infrared and other wireless media. Computer storage media includes any method or technology for the storage of information such as computer readable instructions, data structures, program modules or other data. By way of example, and not limitation, computer storage media includes RAM, ROM, EPROM, flash memory or other memory technology, CD-ROM, digital video disks (DVD) or other optical disk storage, magnetic storage devices, or any other media that can be used to store the desired information and that can be accessed by the computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the computer 100 through input devices such as a keyboard 140 and a pointing device 142. In addition, a video camera 143 (or other types of video devices) may be connected to the computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and generally includes many or all of the elements described above relative to the computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the computer 100 is connected to the local network 154 through a network interface or adapter 158. When used in a WAN networking environment, the computer 100 commonly includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device 152. It will be appreciated that the network connections shown are exemplary and other means of establishing a communications link between the computers may be used.

I. Introduction

As shown in FIGS. 2-10 for the purposes of illustration, the invention is embodied in a system and a method for a system for maintaining a background model of an image sequence by processing on multiple spatial scales. The background maintenance system includes a pixel processing module (pixel scale) that classifies pixels and assigns a current background model and at least one refinement module. The refinement module may include a region processing module (regional scale) for segmenting entire foreground objects by examining relationships between groups of pixels and a frame processing module (frame scale) for automatically updating the current background model. Further, the invention disclosed herein includes a method for maintaining a background model of an image sequence by providing a current background model and providing initial pixel assignments using a pixel processing. Additional refinement of the initial pixel assignment is provided using region processing, and further refinement of the current background model is made using frame processing.

A background model of an image sequence is maintained by processing each frame of the image sequence using multiple spatial scales. These multiple spatial scales include a pixel scale, a regional scale and a frame scale. In general, processing on a pixel scale means that the image sequence is processed by looking at each pixel independently and ignoring information observed at other pixels. Based on this pixel processing, the image sequence is given a current background model and initial assignments of each pixel are made as either background or foreground. Processing on a regional scale, which helps further refine the initial assignment of each pixel, considers relationships between pixels. Region processing is particularly useful in detecting the interior pixels of a homogeneously colored foreground object by finding the boundary pixels of the object and filling in the object by considering the relationship between neighboring pixels. Processing on a frame scale considers each frame of the image sequence as a whole. In particular, frame processing further refines the current background model assignment made by pixel processing by determining whether the current background model adequately represents the actual background. Frame processing is particularly effective when a large background change has occurred (such as large changes in illumination of a scene).

The image background maintenance system and method provides accurate, efficient, adaptive background maintenance. In particular, performing processing of an image sequence on multiple spatial scales ensures that a current background model is the most accurate representation of the actual background, even if the image sequence recently has undergone a substantial background change. Further, the image background maintenance system and method can efficiently adapt to any changes in the image sequence by performing processing on the image sequence using multiple spatial scales. In particular, pixel processing provides a current background model and an initial assignment of each pixel as either background or foreground by considering each pixel independently. Region processing further refines the initial pixel assignment by considering relationships between pixels and possibly reassigning pixels based on these relationships. Moreover, frame processing further refines the current background model by determining whether any changes have occurred in the image sequence and, if needed, providing a more accurate background model. This novel approach of the invention disclosed herein provides accurate, efficient and adaptive background maintenance even when the actual background of the image sequence is changing.

II. General Overview

Figure 2:
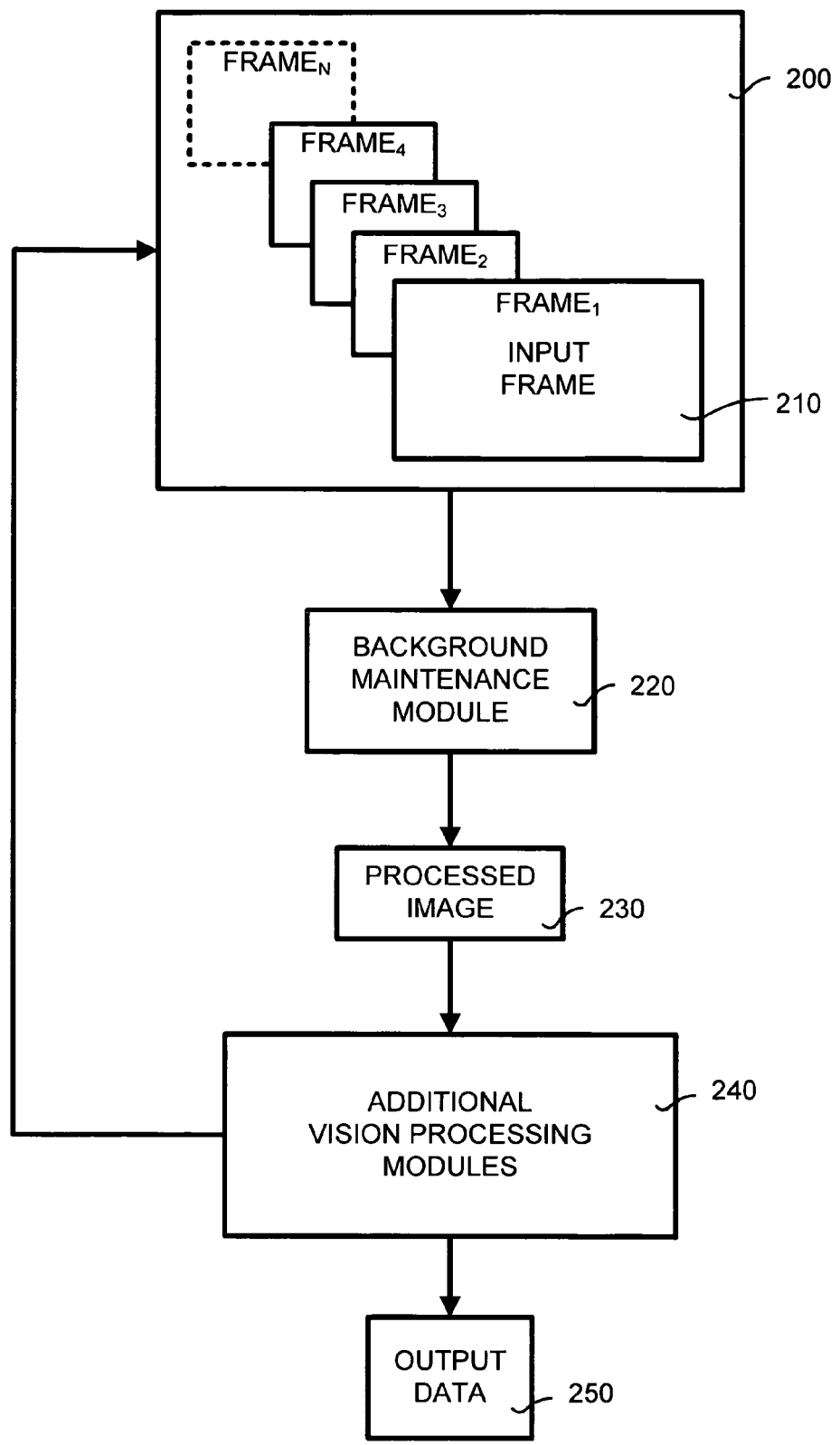
FIG. 2 shows an overall block diagram of a computer vision system incorporating the invention disclosed herein.

FIG. 2 is an overall block diagram of a computer vision system incorporating the invention disclosed herein. This computer vision system is only one example of several types of systems that could incorporate the background maintenance module. In general, an input to the computer vision system is an image sequence 200 that contains several frames (shown in FIG. 2 as frame$_1$ through frame$_N$) where each frame is a single image (or input frame) that is a collection of individual pixels. The image sequence 200, which depicts a scenario of interest, preferably includes temporally sequential images so that, for example, frame$_1$ is earlier in time than frame$_2$, frame$_2$ is earlier in time than frame$_3$ and so forth. Alternatively, any ordered subset of a sequence may be used (for example, every second or every third frame in a sequence). The image sequence 200 may be obtained from a storage device (for example, a hard drive or an optical disk) or live from a video camera (either stationary or moving). The system receives a single frame (or input frame) 210 of the image sequence 200 into a background maintenance module 220. In general, the background maintenance module 220 initially processes the input frame 210 on a pixel-by-pixel basis and classifies each pixel as either background or foreground. As explained above, this differentiation between background and foreground ensures that the foreground pixels, which are commonly processed further, are separated from the background pixels.

Once the foreground pixels have been identified by the background maintenance module 220 they are assembled into a foreground image 230 and, if desired, sent to additional vision processing modules 240 for further processing. In some situations the additional vision processing modules 240 may provide feedback to the background maintenance module 220. If this feedback or other vision processing is not required, the desired output data 250 is distributed.

By way of example, the above-described computer vision system may be a video surveillance system having a stationary video camera directed at a parking lot. The video camera would record a series of frames containing the parking lot scene and the image sequence would be either stored or sent to the background maintenance module 220 where background pixels would be separated from foreground pixels. For example, if a car were to drive into the parking lot the background maintenance module 220 would classify those pixels representing the car as foreground and other pixels as background, because the car has not been modeled by background maintenance and, therefore, would most likely be of interest and require further processing. Accordingly, these identified foreground pixels would be assembled as a foreground image of the car and sent to additional vision processing modules 240 for further processing. For instance, the foreground image containing the car may be processed such that the license number, make, model and color of the car are identified. This data would be distributed as output data 250 to human operators or other processing elements.

Figure 3:
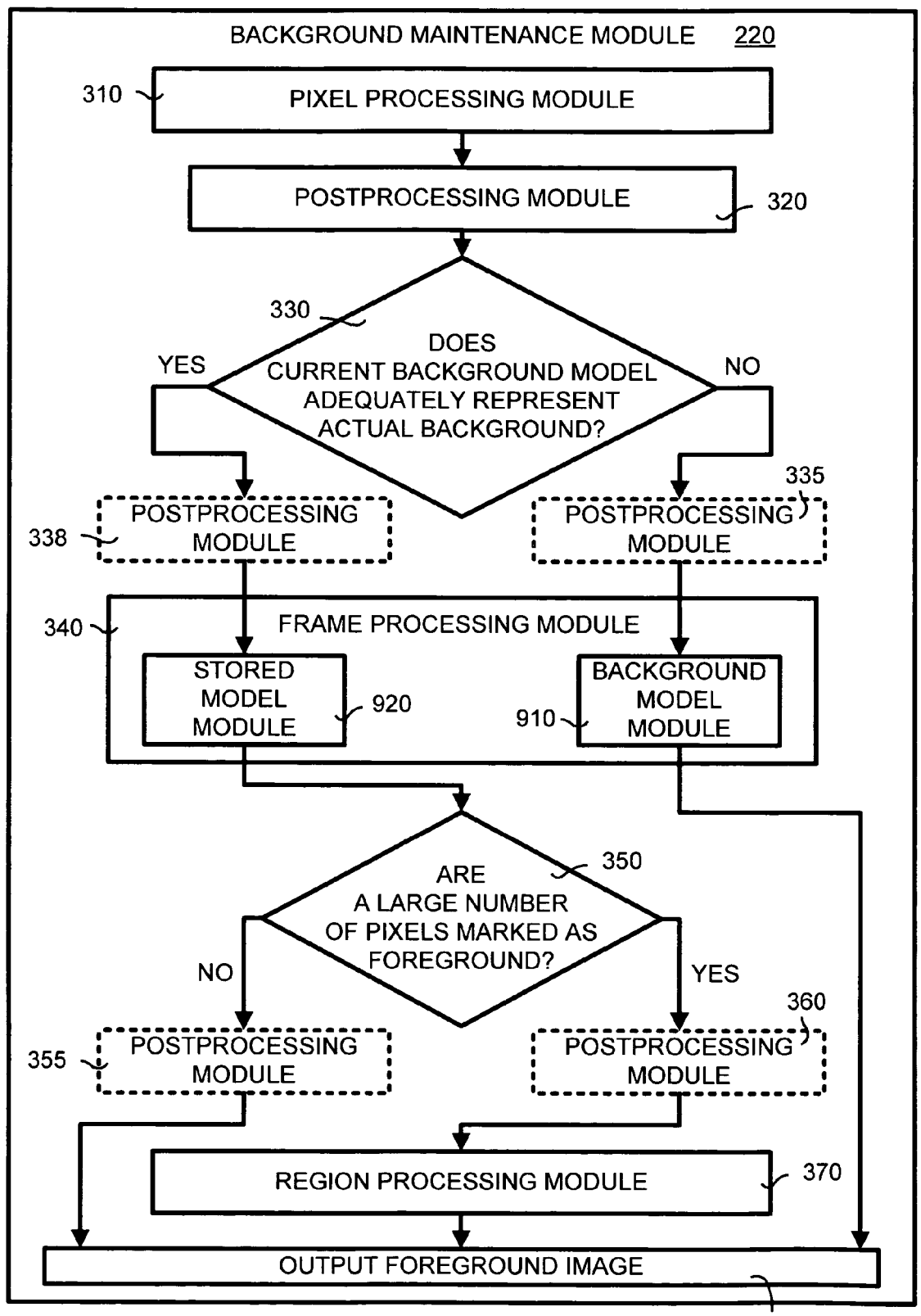
FIG. 3 is a block-flow diagram illustrating the background maintenance module of FIG. 2.

FIG. 3 is a block-flow diagram illustrating the background maintenance module 220 of FIG. 2. In general, the background maintenance module 220 receives an input frame, separates the input frame into a foreground image (usually for further processing) and a background image (to maintain and update a current background model) and outputs the foreground image. A pixel processing module 310, which performs processing on a pixel scale, provides an initial classification or assignment of whether an individual pixel is a foreground pixel or a background pixel. In addition, at least one refinement module may be included within the background maintenance module 220 to further refine the initial pixel assignments and provide more accurate and efficient maintenance of the current background model. This background maintenance ensures that, even if large background changes have recently occurred, the background model that exists at any given time is an accurate representation of the actual background.

Preferably, two refinement modules are included within the background maintenance module 220: (1) a region processing module 370, which performs processing on a region scale; and (2) a frame processing module 340, which performs processing on a frame scale. Preferably the pixel processing module 310, the region processing module 370 and the frame processing module 340 are all included within the background maintenance module 220. Further, processing by the pixel processing module 310 preferably is performed on each input frame along with processing from either the region processing module 370 or the frame processing module 340, as explained below. However, other embodiments of the background maintenance module 220 include using all three processing modules to process the input frame and processing the input frame using the pixel processing module 310 alone.

In a preferred embodiment, the pixel processing module 310 receives the input frame and performs statistical pixel processing individually on each pixel in the input frame. The pixel processing includes a technique to determine if a given pixel is correctly explained by the background pixel model. This background model is generally derived in some manner from previous frames in the sequence. In this way, foreground pixels are separated from background pixels on pixel-by-pixel basis by considering each pixel in the input frame as an isolated entity.

After the foreground pixels are separated from the background pixels by the pixel processing module 310, postprocessing may occur in the postprocessing module 320. In general, postprocessing is used to enhance a portion or the whole of the input frame such as, for example, speckle removal from a foreground image. Other postprocessing techniques may be used that are known to those skilled in the art. Alternatively, as shown by the dotted lines in FIG. 3, postprocessing may occur in postprocessing modules 335 and 338 prior to frame processing, a postprocessing module 355 prior to output and a postprocessing module 360 prior to region processing.

Next, the background maintenance module 220 examines the input frame to determine whether the current background model (which is preferably assigned by the pixel processing module 310) adequately represents the actual background (box 330). If the actual background is not adequately represented, then the input frame is sent to the background model module 410 of the frame processing module 340. Preferably, in this situation, region processing is not performed on the input frame. If the actual background is adequately represented then the input frame is sent to the stored model module 420. The stored model module 420 determines whether the current background model should be stored as one of the stored models. Both the background model module 410 and the stored model module 420 are discussed further below. Preferably, the analysis of whether the actual background is adequately represented is accomplished by monitoring pixels in the input frame. In particular, if a large percentage of pixels in the input frame have changed a selected property (such as pixel color) more than a certain amount, then the current background model does not adequately represent the actual background. As an example, the fraction of foreground pixels in the input frame can be monitored and if this fraction exceeds, for instance, 70% the current background model would not be considered an adequate representation of the actual background. Alternatively, other percentages and analysis methods may used to define whether the actual background is adequately represented by the current background model.

For example, the frame processing module 340 may contain a stored model of a parking lot in the morning and other stored models of the parking lot in the afternoon and evening when the lighting conditions have changed. The current background model may be of the parking lot in the morning, but if the lighting conditions have changed the actual background may be significantly different from the current background model. In this situation, the current background model is not an adequate representation of the actual background and the input frame is sent to the background model module 410. This module determines whether any stored background models more adequately match the actual background conditions. If one of these stored background models more adequately represents the actual background (i.e. is a better match) then that stored model (e.g. a stored model representing the parking lot in the evening) is substituted for the current background model. As another example, if a man walks into a dark room and turns on a light, a stored background model of the room with lights on is substituted for the current background model of the room with the light off. Moreover, the current frame of the man in the room who has just turned on the light is compared to the new background model of the room with the light on.

If the actual background is adequately represented by the current background model then the input frame is sent to the stored model module 420 to determine whether the current background model should become a stored background model. After processing by this module, the input frame is examined to determine whether a large number of pixels in the input frame were marked as foreground pixels (box 350). If a large number of pixels were not marked as foreground pixels then the input frame may undergo postprocessing in the postprocessing module 355, as discussed above. Regardless of whether this postprocessing occurs, the background maintenance module 220 then outputs a foreground image that includes the foreground pixels assembled into a foreground image (box 380). If examination of the input frame (box 350) determines that a significant number of pixels were marked as foreground pixels then the input frame may be sent to the optional postprocessing module 360, which is discussed above, and then to the region processing module 370. The region processing module 370 further processes the input frame to detect entire foreground objects that may have been missed by the pixel processing module 310. Because region processing occurs on a regional scale (using groupings of pixels) instead of on an individual pixel scale, the region processing module 370 is able to identify and segment foreground objects that may otherwise either go unnoticed or be only partially detected. For example, an input frame may contain a person wearing a solid red shirt and asleep on a couch. As the person awakes and moves, there will be many pixels that will stay red and not be classified as foreground by pixel processing even though the person is moving. The region processing module 370, however, will detect the movement of the person by recognizing that the pixels are changing around the edges of the shirt, segmenting the outline of the shirt and classifying the shirt as foreground. After the input frame has been processed by the region processing module 370 a foreground image is sent as output (box 380).

III. Pixel Processing Module

The pixel processing module performs statistical pixel processing on a frame within an image sequence. Each frame is processed on a pixel-by-pixel basis and is given an initial classification as either a background pixel or a foreground pixel (although subsequent processing by other modules could change this initial classification). The pixel processing module uses a predictive technique and associated prediction parameters to provide multiple predictions about the value of a pixel in a subsequent frame. Any pixel that deviates significantly from these predicted values is classified as a foreground pixel; otherwise, the pixel is classified as a background pixel. Further, at least one of the multiple predictions is based on a history of actual pixel values while at least one of the other predictions is based on a history of predicted pixel values.

The pixel processing module includes: (i) a computation module, for storing and calculating history values and prediction values; (ii) a prediction module, for determining, based on various history values, multiple predictions of the pixel values; (iii) an update module for updating the history of predicted history values; (iv) a declaration module, for declaring a pixel as a background pixel or a foreground pixel; and (v) a recomputation module, for replacing prediction parameters with recomputed prediction parameters, if necessary. Each of these modules is discussed in detail below.

Pixel Processing Module Structure

Figure 4:
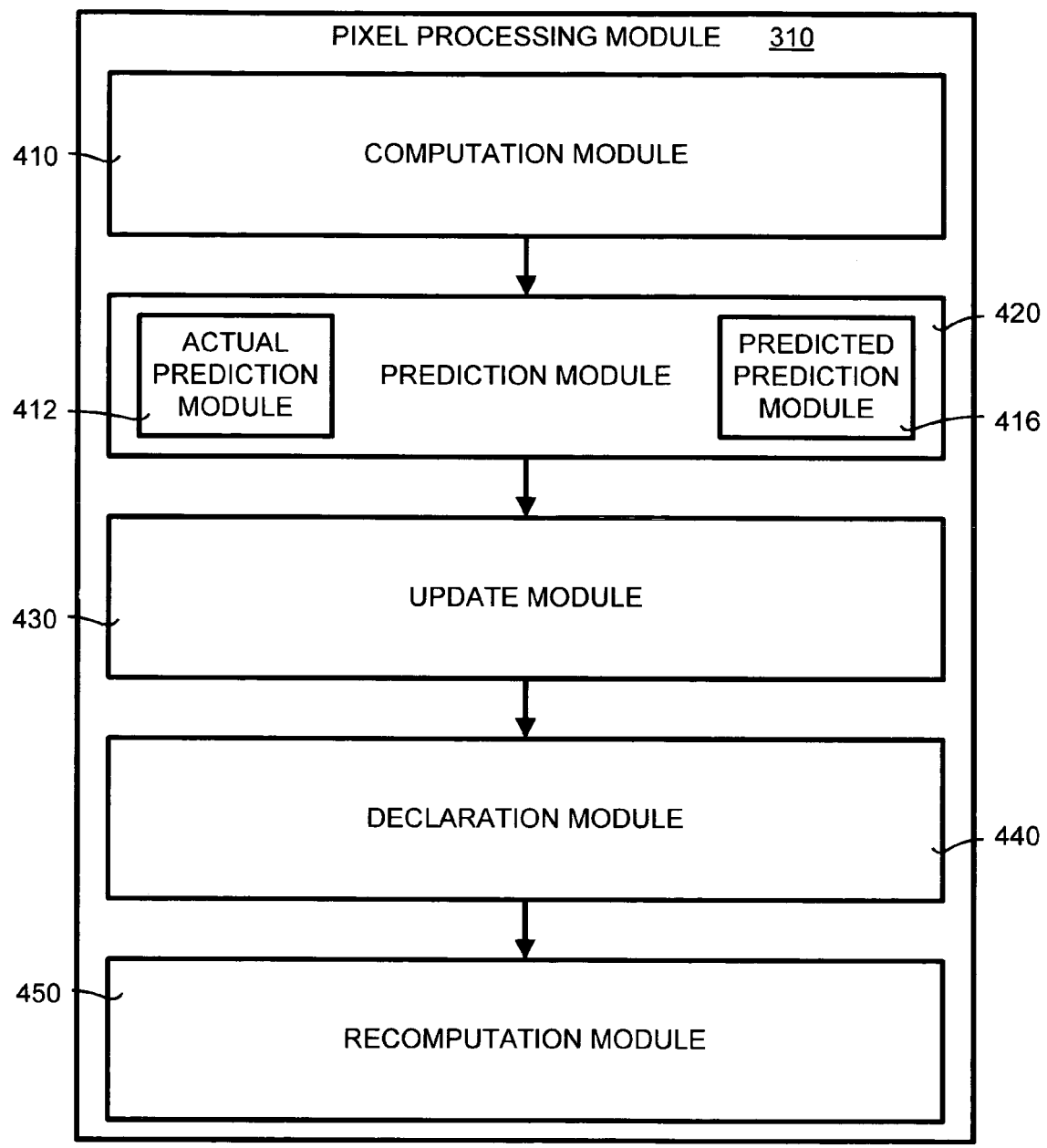
FIG. 4 is a block diagram illustrating the pixel processing module of FIG. 3.

FIG. 4 is a detailed block diagram illustrating the pixel processing module 310 of FIG. 3. As shown in FIG. 4, the pixel processing module 310 includes a computation module 410, a prediction module 420, an update module 430, a declaration module 440 and a recomputation module 450.

An input frame is received by the pixel processing module 310 and is generally part of an image sequence. Generally, pixel processing is performed on each individual pixel in the input frame and continues for subsequent frames. The computation module 410 stores and calculates history and prediction values that are used in the prediction calculation. Next, the prediction module 420 provides at least two predictions of what value a particular pixel will be in the next frame to be processed. The prediction module 420 includes an actual prediction module 412, for predicting a subsequent pixel value based on actual past pixel values, and a predicted prediction module 416, for predicting the subsequent pixel value based on predicted past pixel values. Next, the prediction module 420 compares the actual pixel value to the predicted values and determines which of the predicted values has the least amount of error.

The update module 430 takes the prediction having the least amount of error (i.e. the best prediction) and appends that predicted value to the history (or list) of predicted values. The declaration module 440 determines whether the deviation between the best predicted value and the actual pixel value is less than a threshold value, and, if so, classifies that pixel as a background pixel. Otherwise, the pixel is classified as a foreground pixel. The recomputation module 450 recalculates the prediction parameters based on the actual pixel value obtained during processing of the current input frame and the history of actual values. As explained further below, at least some of these newly recomputed prediction parameters are compared to the current prediction parameters and, if less than an error factor times the current prediction parameters, the current prediction parameters are replaced by the new prediction parameters. Otherwise, the current prediction parameters are used in the pixel processing of the next frame. The output from the pixel processing module 310 is assembled into a processed image which preferably includes a foreground image (containing foreground pixels) and a background image (containing background pixels).

Pixel Processing Module Operation

In general, pixel processing module 310 uses statistical image processing to determine whether a pixel in an input frame should be classified as foreground or as background. A series of frames are processed individually, statistics are gathered concerning each individual pixel in the frame, predictions are made as to what the value of the pixel will be in the next frame, the actual value of the pixel is determined and if the actual value deviates more than a threshold amount from the predicted value the pixel is classified as a foreground pixel. Predictions are made using a prediction technique (for example, a linear prediction technique) which takes the past values of the pixel and predicts what the value of that pixel will be in the next frame. At least two predictors are used and if the actual pixel value is significantly different from any of the predictors the pixel is considered a foreground pixel.

As a working example, the prediction technique used is a Wiener filter, which is a linear predictor based on a recent history of values. For a given pixel, the linear prediction of its next value in time is:

$$s_{tp} = \sum_{k=1}^{p} a_k s_{t-k}$$

where $s_{tp}$ is the predicted value of the pixel at the next frame at time t, the $s_{t-k}$ are past values of the pixel, and the $a_k$ are the linear prediction coefficients. The Wiener filter uses p past values to make its prediction, for example, p=30. The expected squared prediction error $E[e_t^2]$ is given by:

$$E[e_t^2] = E[S_t^2] + \sum_{k=1}^{p} a_k E[S_t S_{t-k}]$$

These $a_k$, or prediction coefficients, are computed from past actual pixel values. Details of these computations can be found in "Linear Prediction: A Tutorial Review" by J. Makhoul in *Proceedings of the IEEE*, 1975, 63(4), pp. 561-580, the entire contents of which are hereby incorporated by reference. A number, n, of these past actual pixel values are used to compute p prediction coefficients. For example, in this working example n=50 and p=30 so that the past 50 actual pixel values are used to calculate 30 prediction coefficients. If the actual value of the pixel in the next frame differs from any of its predicted values by more than a threshold value the pixel is classified as a foreground pixel. In this working example, the threshold value was defined by the equation:

$$4.0 * \sqrt{E[e_t^2]}$$

Therefore, if any actual pixel value differed from its predicted values by more than this calculated amount, the pixel is declared a foreground pixel. The two predictions in this example implementation are based on: (1) the actual history; and (2) the predicted history, both using the same prediction parameters. In this working example the sampling rate was 4 Hz and the 30 images on which the predictions are based covered a period of 7.5 seconds. Further, the prediction coefficients and expected squared prediction error are recomputed for every new frame. These are computed from the n most recent actual history values for the pixel.

The use of two predictors provide the pixel processing module 310 with the ability to accurately maintain a model of the background even if the background is briefly concealed by a foreground object. If a foreground object appears, the actual history for the pixels on the foreground object will become corrupted, containing some background and some foreground pixels. However, the predicted history will continue to predict the background, because it is based only on what the background model predicts.

The invention disclosed herein also adapts to changes in the background by computing a new set of prediction parameters upon receipt of every new frame. If, for instance, a chair is moved into the scene, the prediction parameters for the affected pixels will eventually change to predict the chair pixels rather than what was there before.

Figure 5A:
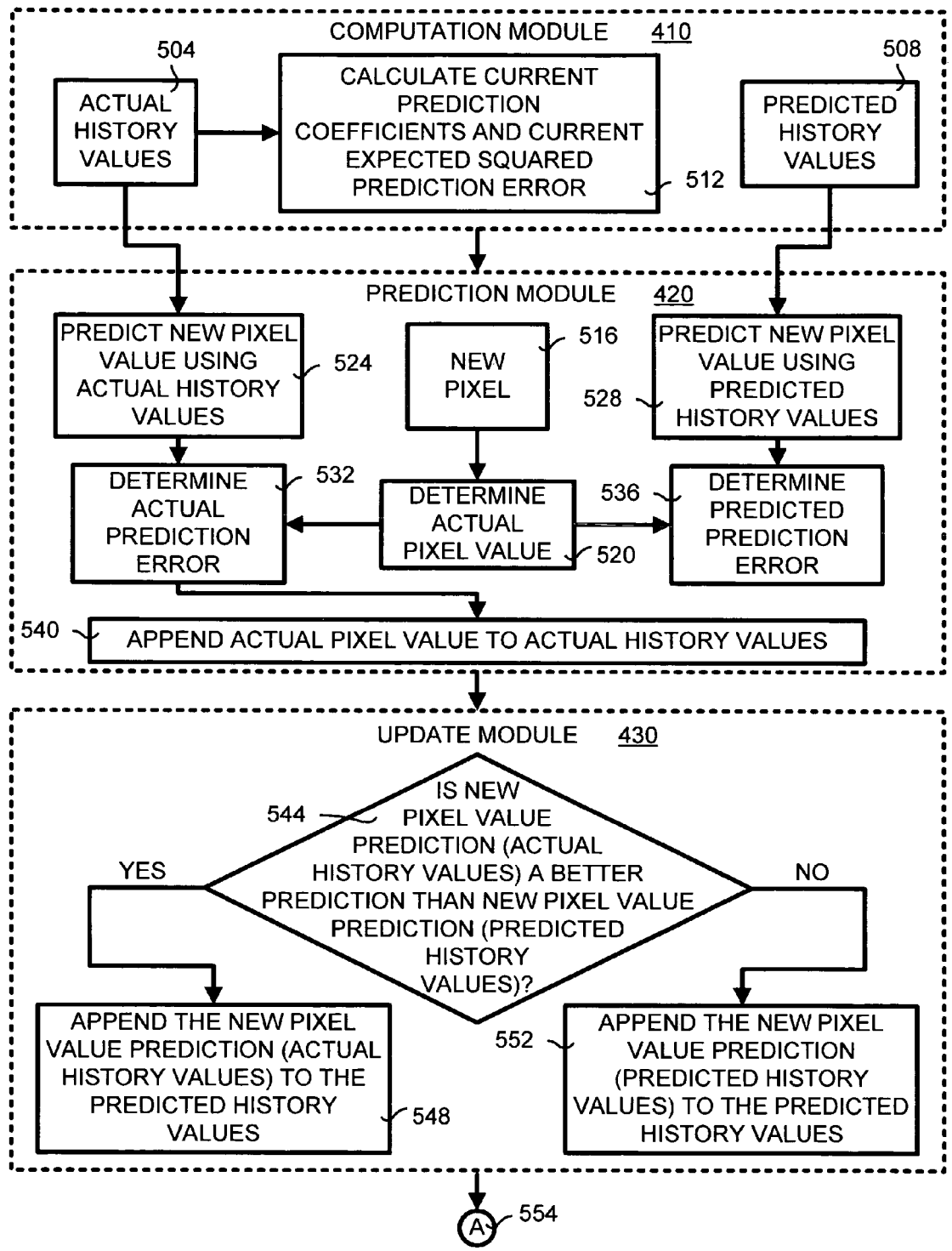
FIG. 5A is a detailed flow diagram illustrating the computation, prediction and update modules of FIG. 4.
Figure 5B:
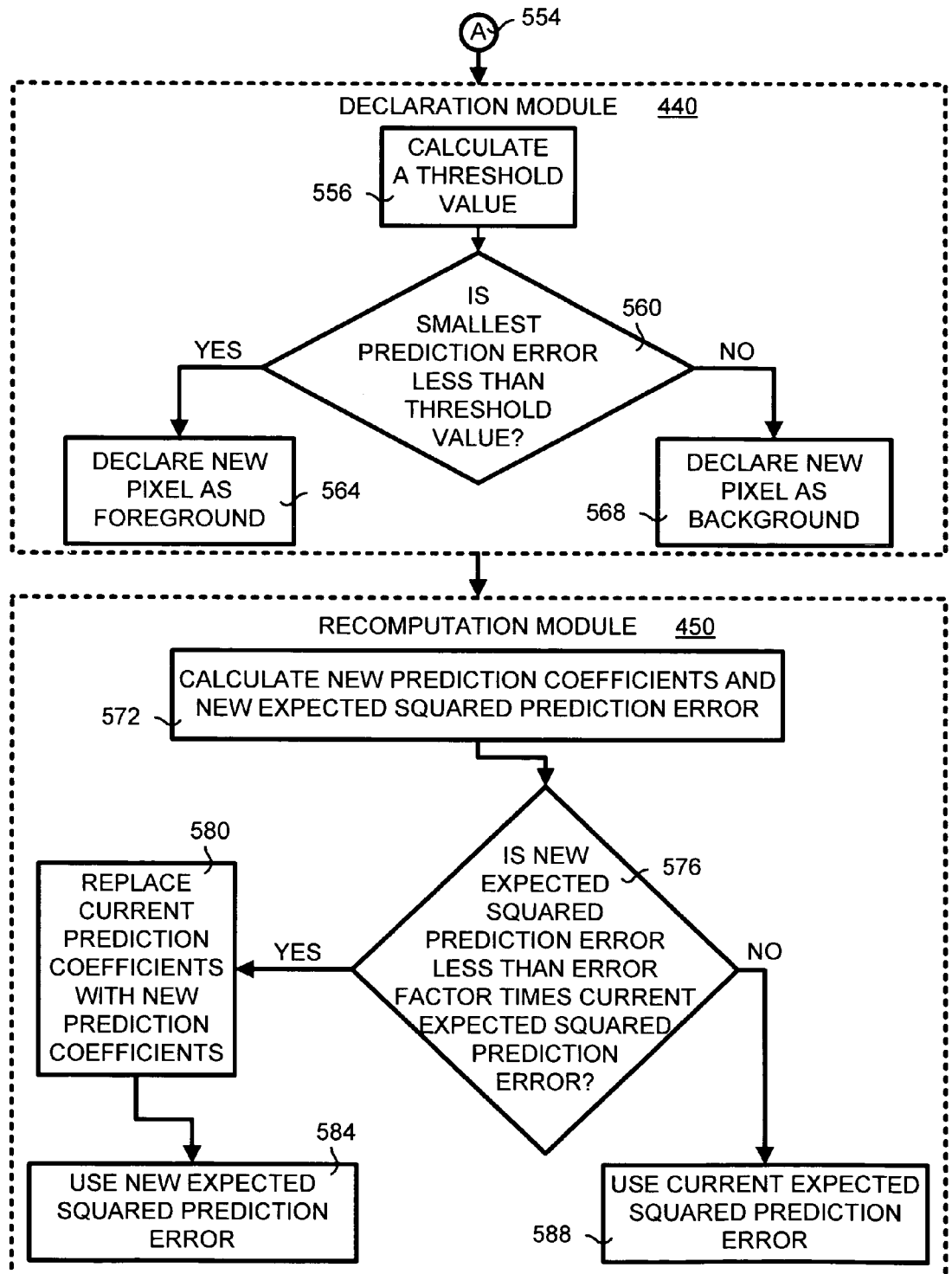
FIG. 5B is a detailed flow diagram illustrating the declaration and recomputation modules of FIG. 4.

FIGS. 5A and 5B are detailed flow diagrams illustrating the operation of the modules shown in FIG. 4, namely, the computation, prediction, update, declaration and recomputation modules. The operation of each of these modules will now be discussed.

Computation Module

The computation module 410 stores a list of at least two types of past pixel values. These past pixel values, which are used in the prediction calculations, include a history of actual pixel values 504 and a history of predicted pixel values 508. The actual history values 504 are used in the calculation of the prediction parameters. These calculations help predict what value a pixel will have in subsequent frames and are the basis for classifying the pixel as either a foreground pixel or a background pixel. For example, the actual history values 504 are used to calculate the prediction coefficients and the current expected squared prediction error (box 512), both of which are used in the prediction module 420 and the declaration module 440 to classify a pixel.

Prediction Module

The prediction module 420 receives a single input frame that is preferably part of an image sequence. A new pixel 516, which is part of the input frame, has its pixel value determined (box 520). At least two predictions are made based on different history values. For example, a new predicted pixel value based on actual history values 504 is calculated (box 524) and a new predicted pixel value based on predicted history values 508 is calculated (box 528) using a prediction technique (for example, the Wiener filter described above). A comparison is made between each of the new predicted values and the actual pixel value. For instance, an actual prediction error is determined by comparing the new pixel value using actual history values to the actual pixel value (box 532) and a predicted prediction error is calculated by comparing the new pixel value using predicted history values to the actual pixel value (box 536). Further, the actual pixel value is appended to the actual history values (box 540) to provide a constantly updated list of actual history values.

Update Module

In general, the update module 430 finds the predictor that best predicted the actual pixel value and appends the predicted history values 508 with the value from this predictor. As an example, the new pixel value prediction using actual history values is compared to the new pixel value prediction using predicted history value (box 544). If the prediction based on actual history values is the better predictor, that prediction value is appended to the predicted history values (box 548). Otherwise, the prediction based on predicted history values is appended to the predicted history values (box 552).

Declaration Module

The declaration module 440 compares a threshold value to the best predictor and classifies a pixel as either a foreground pixel or a background pixel. The main function of the declaration module is to use information provided by the computation module 410 and the prediction module 420 to classify a pixel. For example, in the declaration module each of the prediction values (calculated in the prediction module 420) is compared to the actual pixel value to determine the prediction with the lowest error. The deviation from this best prediction is compared to a threshold and the pixel is classified according to the result.

The first function of the declaration module is to determine a threshold value (box 556). This threshold value may be user defined and calculated based on prediction parameters or an arbitrary value that is empirically assigned. For example, the threshold value of the working example above is a function of the expected squared prediction error. This threshold value is compared to the smallest prediction error, in other words, the best prediction and the prediction that most correctly predicts the actual pixel value (box 560). If the smallest prediction error is less than the threshold value the pixel is declared as a foreground pixel (box 564). Otherwise, the pixel is declared as a background pixel (box 568).

Recomputation Module

The recomputation module 450 recomputes the prediction parameters for every new input frame that is processed. This provides better adaptation and is especially useful when the system is first turned on and there is a limited history. New prediction parameters are computed and then compared to the old prediction parameters. For example, new prediction coefficients are computed using the actual history values and the actual pixel value determined in the prediction module 420 (box 572). In addition, a new expected squared prediction error is calculated from these new prediction coefficients and actual history values (box 572).

The new prediction parameters are then compared to the current prediction parameters to determine which has the least amount of error. For example, the new expected squared prediction error is compared to an error factor times the current expected squared prediction error (box 576). If the new expected squared prediction error is less than the error factor times the current expected squared prediction error, the current prediction coefficients are replaced with the new prediction coefficients (box 580). Further, the new expected squared prediction error replaces the current expected squared prediction error (box 584). Otherwise, the current prediction parameters (e.g. the prediction coefficients and the expected squared prediction error) are retained. The error factor is preferably an empirically determined value that takes into account image noise. In the working example above, the error factor is equal to 1.1, meaning that new prediction coefficients are retained if the corresponding expected squared prediction error is less than 1.1 times the current expected squared prediction error. This 10% increase is provided to account for objects in the frame that might have more noise associated with them.

IV. Region Processing Module

The region processing module processes an input frame on a regional scale to segment an entire foreground region within the input frame and provide instantaneous adaptation of a background model in response to a background change between frames. Processing on a regional scale includes segmenting an entire foreground region of an input frame by finding the foreground region (using an initial classification of each pixel in the input frame by the pixel processing module), determining a boundary of the region and filling in the foreground region.

The region processing module includes: (i) an image differencing module, for determining moving pixels within an input frame; (ii) an intersection module, for identifying which of the moving pixels are foreground pixels and defining these pixels as a foreground region; (iii) a histogram module, for determining the pixel qualities of a boundary of the foreground region; and (iv) a backprojection module, for filling in the foreground region using histogram information and thereby segmenting the entire foreground region from the remainder of the input frame. Each of these modules is discussed further below.

Region Processing Module Structure

Figure 6:
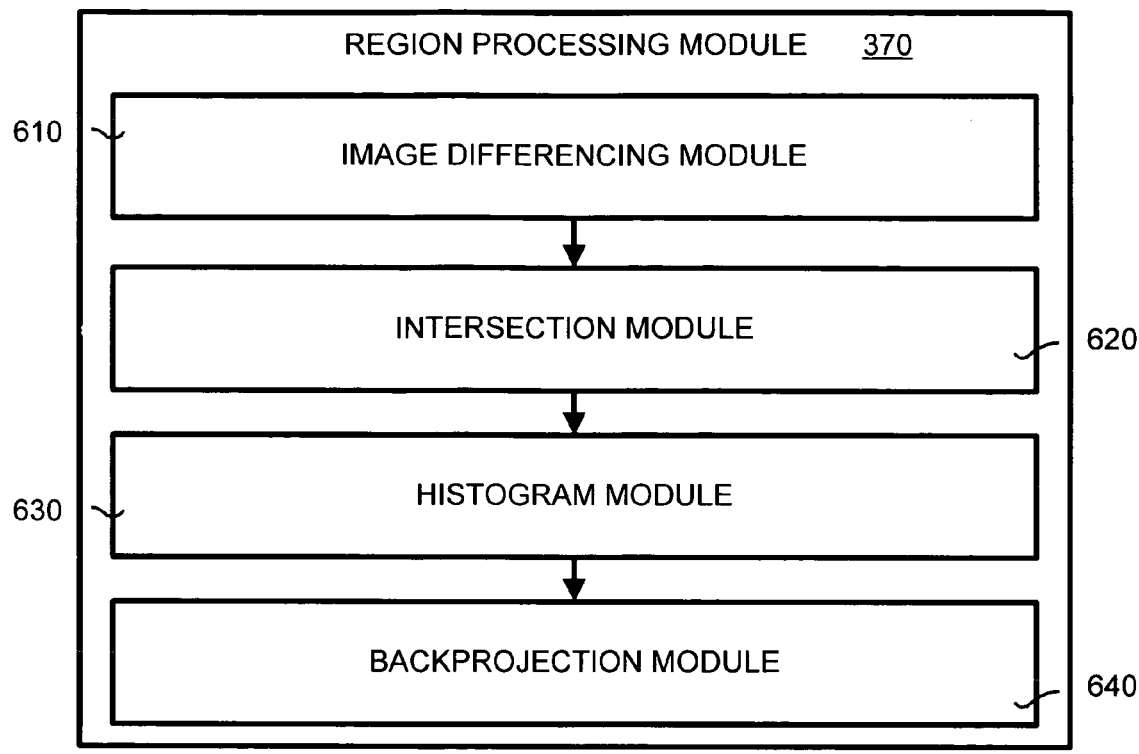
FIG. 6 is a block diagram illustrating the region processing module of FIG. 3.

FIG. 6 is a block diagram illustrating the region processing module of FIG. 3. As shown in FIG. 6, the region processing module 370 includes an image differencing module 610, an intersection module 620, a histogram module 630 and a backprojection module 640.

An image sequence 200, which is preferably a series of temporally sequential images (or frames), is received by the region processing module 370. In general, the image differencing module 610, which determines the pixels that are moving between frames, takes the difference between adjacent frames and outputs these differenced images. Next, the intersection module 620, which determines the foreground pixels that are moving between frames, calculates intersection of the differenced images and a previous foreground image provided by the pixel processing module 310 to create an intersection image.

The intersection image along with the current input frame being processed are inputs to the histogram module 630. This module determines the boundaries of the foreground region found by the intersection module 620. A histogram is calculated that includes all the pixel values that appear in both the original image and the intersected image at a location indicated by the previous foreground image. The backprojection module 640 then fills in the foreground region in order to segment the entire foreground region from the rest of the input frame. As explained further below, the histogram, which is calculated in the histogram module 630, is backprojected onto the original image using connectivity. Any connected pixels that contain values whose count in the histogram is below a certain threshold are removed. Otherwise, the pixels are used to fill in the foreground region and construct an updated foreground image.

Region Processing Module Operation

In general, the region processing module 370 determines the spatial extent of a foreground region contained in an input frame and segments this region in its entirety. The determination of the spatial extent of the foreground region is performed by finding a grouping of moving pixels and using pixel information to extract a region of foreground pixels from these moving pixels. The boundary of this foreground region is determined by calculating a histogram to determine the leading and trailing edges of the region. A backprojection of the histogram onto the image at the boundary of the foreground region is performed and the foreground region is filled in. The region processing module 370 extracts and segments a foreground region in an input frame and refines any initial classification of pixels performed by pixel processing.

Figure 7:
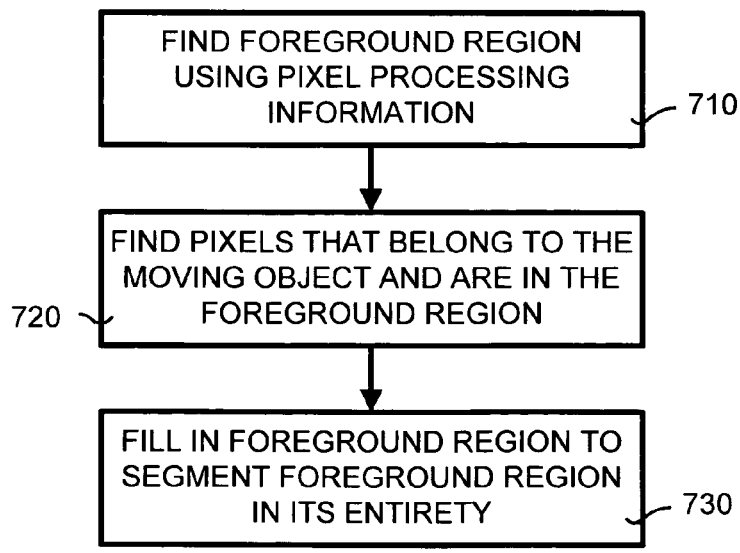
FIG. 7 is a flow diagram of the operation of the region processing module.

FIG. 7 is a flow diagram of the operation of the region processing module. First, foreground regions in an input frame are found using information obtained from pixel processing (box 710). In particular, foreground pixels discovered by pixel processing are used to group pixels into foreground regions that may include background pixels that have been classified incorrectly by a pixel processing. Preferably, the pixel processing module (discussed above) is used but other types of pixel processing systems may also be used. Next, those pixels which belong to the moving foreground object and which are in the foreground are identified (box 720). Usually, these pixels will appear on the boundary of the object.

After the boundary is determined, the foreground region is filled in to segment the entire foreground region from the input frame (box 730). This operation includes backprojecting the histogram onto the input frame at the boundary of the foreground region and finding neighboring pixels having similar pixel properties. Similar neighboring pixels are included within the foreground region and result in the extraction of the entire foreground region from the input frame.

Figure 8A:
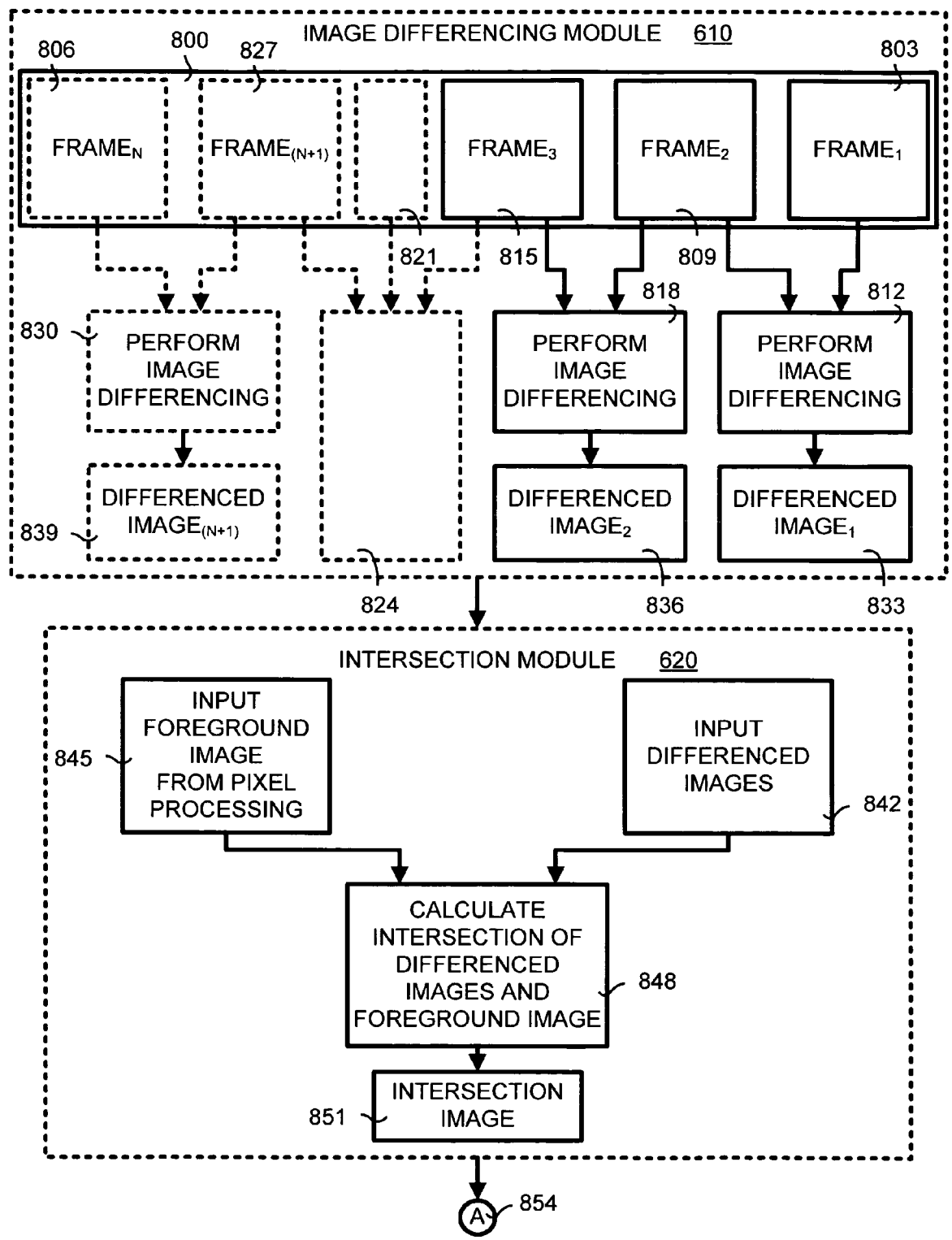
FIG. 8A is a detailed flow diagram illustrating the image differencing and intersection modules of FIG. 6.
Figure 8B:
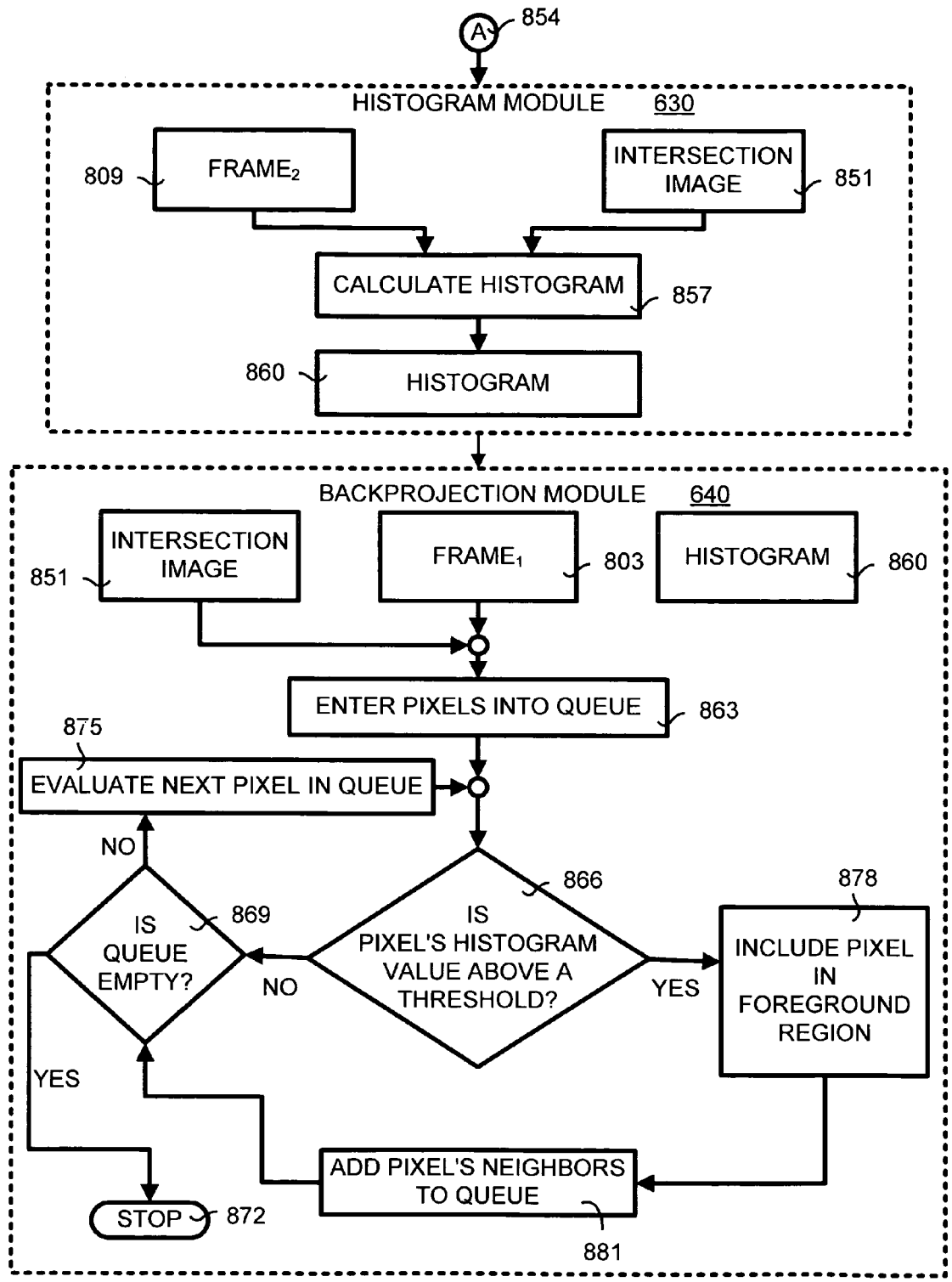
FIG. 8B is a detailed flow diagram illustrating the histogram and backprojection modules of FIG. 6.

FIGS. 8A and 8B are detailed flow diagrams illustrating the operation of the modules shown in FIG. 6, namely, the image differencing 610, intersection 620, histogram 630 and backprojection 640 modules. The operation of each of these modules will now be discussed.

Image Differencing Module

Generally, the image differencing module 610 identifies pixels that have moved between a current frame and previous frames. The pixels in this image sequence are identified by taking the difference of adjacent images. In particular, as shown in FIG. 8A, the input to the image differencing module 610 is an image sequence 800 including the frames spanning input frame$_1$ 803 to input frame$_N$ 806.

Next, adjacent images are differenced (or subtracted) to obtain a differenced image. For example, input frame$_1$ 803 and input frame$_2$ 809 are differenced (box 812), input frame$_2$ 809 and input frame$_3$ 815 are differenced (box 818) and input frame$_3$ 815 and its neighbor (not shown) are differenced. Box 821 represents the remainder of input frames from adjacent input frame$_{(N+1)}$ to adjacent input frame$_3$, and box 824 represents the image differencing performed and differenced images for these input frames. At the end of the image sequence 800 are input frame$_{(N+1)}$ 827 and input frame$_N$ 806 that are differenced from each other (box 830). The output from the image differencing module 610 are differenced image$_1$ 833, differenced image$_2$ 836 and up to differenced image$_{(N+1)}$ 839.

Intersection Module

The intersection module 620 determines which of the moving pixels are foreground pixels and separates the moving foreground pixels from the moving background pixels. The differenced images contain pixels that have moved over time, and the intersection module 620 combines these differenced images with a foreground image constructed by pixel processing to separate the moving foreground pixels from the moving background pixels. For example, the intersection module 620 may use pixel processing information from the pixel processing module 310 to separate the pixels on a moving pendulum of clock (background pixels) from the pixels on a person that is rising from a chair (foreground pixels).

As shown in FIG. 8A, the intersection module 620 receives the differenced images (spanning differenced image$_1$ 833 to differenced image$_{(N+1)}$ 839) as input (box 842). Further, a foreground image constructed using pixel processing (such as the pixel processing module 310) is received by the intersection module 620 as input (box 845). This foreground image, which is the immediately preceding foreground image in time, contains foreground pixels that have been classified by pixel processing as foreground pixels. The intersection of the foreground image and the differenced images is calculated to determine which of the moving pixels are foreground pixels (box 848) so that an intersection image is constructed (box 851). This intersection image is sent to the histogram module 630 shown in FIG. 8B as indicated by box 854.

Histogram Module

In general, the histogram module 630 records the pixel characteristics of the pixels found by the intersection module 620. More specifically, a histogram is calculated of all the pixels appearing in the intersection image 851, using values from the previous image being processed. As shown in FIG. 8B, the histogram module inputs the intersection image 851 and the previously processed frame, in this case, input frame$_2$ 809. A histogram is calculated for a property of the pixels appearing in the input frame$_2$ 809 (box 857). This pixel property may be, for example, pixel color, intensity and depth. The calculated histogram 860 is then output for the histogram module 630.

The calculation of the histogram includes plotting the frequency of occurrence versus some pixel property. For example, if pixel color is chosen as the pixel property, for each defined color the histogram determines how many pixels have those colors. One adjustment that can be made to the calculation of the histogram is to define a frequency threshold so that pixels occurring less that the threshold are not considered part of the foreground object. The threshold can be defined to more clearly define the boundaries of the foreground region by filtering out any pixels that greatly deviate from the pixel property values of the foreground. In general, there are fewer of these types of pixels than pixels inside the foreground region. For example, if the background is white and the foreground region is a solid red shirt on a person, the threshold may be defined to avoid a "halo" effect around the foreground region whereby the foreground region appears to include colors around the foreground boundary that are between red and white (such as pink).

Backprojection Module

The backprojection module 640 fills in the bounded foreground region and thereby segments the entire foreground region from the remainder of the input image. The backprojection occurs at pixels that are on the boundary of the foreground region and fill in homogenous regions that do not exhibit any differences between images. This module may also change the classification of a background pixel, as classified by pixel processing, to a foreground pixel.

As shown in FIG. 8B, the backprojection module 640 inputs the histogram (box 860), the intersection image (box 851) and the input frame$_1$ (box 803) and uses these to find connected regions that share the pixel properties of the foreground as identified by pixel processing. Connected regions have neighboring pixels with similar pixel properties. In addition, the number of neighbors considered depends on the amount of connectivity. For example, to find a 4-connectivity region for a pixel its four neighboring pixels are examined to determine if the neighboring pixels have properties similar to the pixel. Those neighboring pixels that have a pixel property within a range of the pixel are retained and others are discarded. The backprojection module 640 can use 8-connectivity, meaning that the eight pixels surrounding the subject pixel are examined, or any other form of connectivity as determined by a reasonable definition of "neighboring pixels".

Initially, all pixels that are in the intersection image (box 851) are entered into a queue (box 863). Next, a property of each pixel in the queue is evaluated to determine whether its corresponding value in the histogram is above a threshold (box 866). If the pixel is below the threshold, that pixel is discarded and the queue is examined to determine whether the queue is empty (box 869). If the queue is empty, the process is stopped and the backprojection module is exited (box 872). If the queue is not empty another pixel from the queue is evaluated (box 875).

Conversely, if the pixel property is above the threshold, that pixel is included in the foreground region (box 878) and all of its neighboring pixels are added to the queue (box 881). The queue is then examined to determine whether there are more pixels to examine (box 869). As discussed above, if the queue is empty the process is stopped (box 872) and if the queue is not empty the next pixel in the queue is evaluated (box 875). In this way the backprojection module 640 fills in the foreground region until the queue is empty. The resulting foreground region is then segmented from the original image, replaces the foreground image obtained from pixel processing and thus becomes the new foreground image. By way of example, if we examine a red pixel in an image using 4-connnectivity, any of the four neighboring pixels (e.g., above, below, left and right of the red pixel) that are also red are retained. This process is known as "growing" the region and includes filling in and segmenting the foreground region by considering relationships between the pixels.

V. Frame Processing Module

The frame processing module maintains a background model of an image sequence using background model substitution. In general, the frame processing module processes the image sequence on a frame scale by detecting frame-wide changes in the actual background and providing instantaneous updating of a background model in response to these changes. The frame processing module stores multiple background models and determines whether one of these stored models is a better background model than a current background model. If so, then the best stored background model is exchanged for the current background model and becomes the new background model; otherwise, the current background model is retained.

The frame processing module includes: (i) a stored model module, for storing a reasonable number of background models and ensuring that these stored background models are diverse enough to adequately represent the various background conditions that may occur; and (ii) a background model module, for automatically providing the best background model under the current circumstances. The stored model module further includes a frequency module, for determining if and when a stored background model should be added or replaced, and a benefit module, for determining which of the stored models should be replaced. Each of these modules is discussed in detail below.

Frame Processing Module Structure

Figure 9:
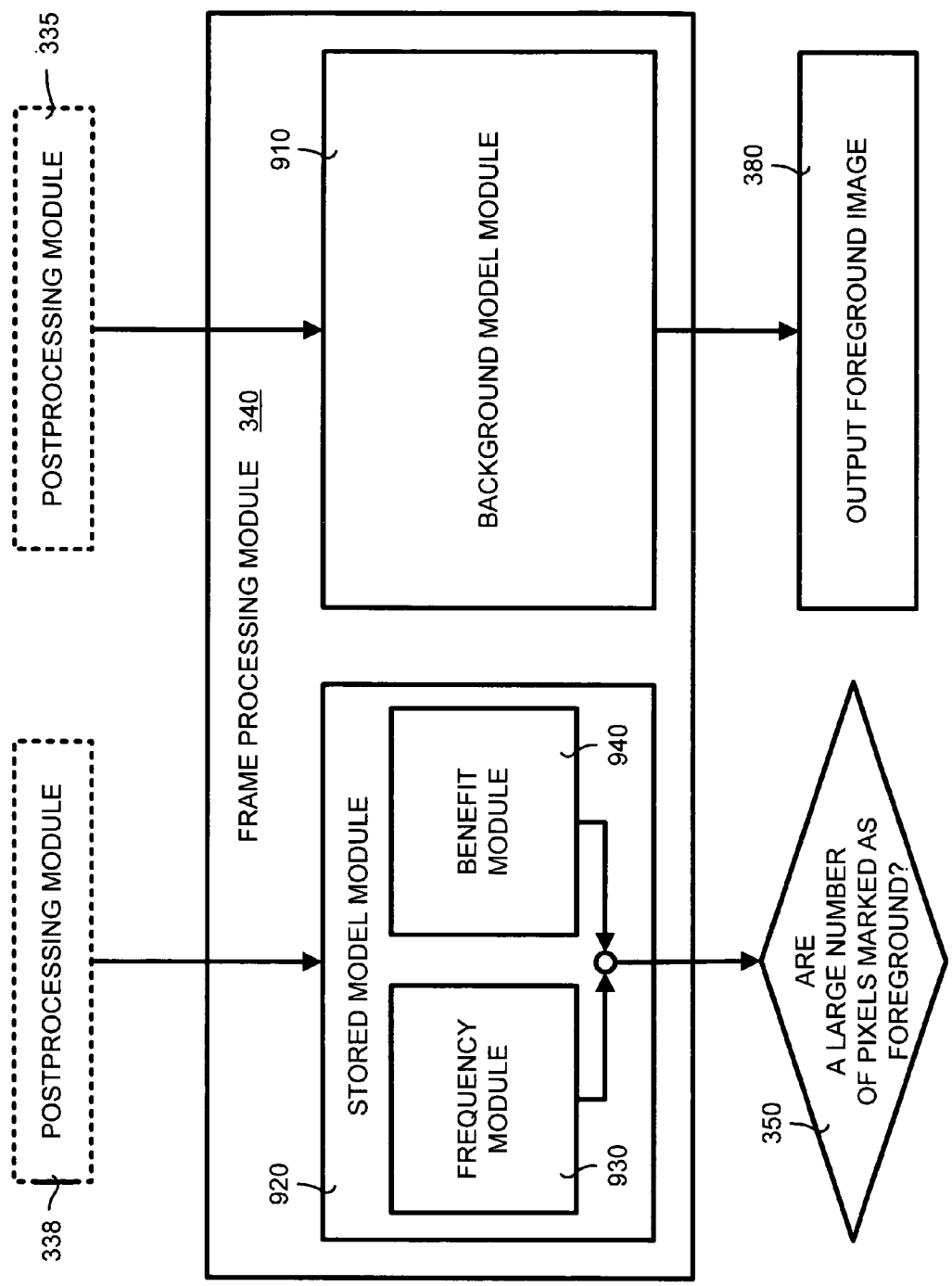
FIG. 9 is a detailed block diagram illustrating the frame processing module of FIG. 3.

FIG. 9 is a detailed block diagram illustrating the frame processing module 340 of FIG. 3. In general, the frame processing module 340 receives an image sequence that has had an initial pixel classification performed on a pixel scale (preferably, by the pixel processing module 310) and outputs a frame-processed image having had further pixel classification performed on a frame-wide scale. Preferably, the image sequence also has been assigned a background model during the initial processing.

As discussed above, the image sequence contains several temporally sequential frames (single images), each frame being a collection of individual pixels. For example, the image sequence may be a surveillance video (either live or stored on storage media) containing numerous frames of a scene (such as a parking lot). As shown in FIG. 9, the frame processing module 340 includes a background model module 910 and a stored model module 920. Initially, the frame processing module 340 determines whether a large change has occurred in the input frame. This situation may indicate that the actual background is not adequately represented by the current background model and a stored background model may provide a better representation. In this case, the input frame is passed to the background model module 910. Otherwise, the input frame is passed to the stored model module 920.

The background model module 910 receives the input frame (along with its current background model assigned during initial processing) and, when the actual background is not adequately represented by the current background, compares the current background model with the stored background models to determine whether one of the stored background models more accurately represents the actual background. In a preferred embodiment, the background model with the lowest percentage of foreground pixels is considered the most accurate, or best, background model. Other techniques for determining the best background model are known to those skilled in the art. If one of the stored models is substituted for the current background model, the input image with its accompanying new background model is sent to the pixel processing module 310 for reprocessing. If the current background model is retained, then there is no need to reprocess at the pixel level. Since the actual background was not adequately represented by the current background model, the model is not passed on to the stored model module 920.

The stored model module 920 determines if and when the stored models need to be updated and which stored models should be replaced. A frequency module 930 determines if and when the updating occurs and prevents the expensive computation performed by a benefit module 940 from being performed too frequently. The benefit module 940 determines which stored module should be replaced. Preferably, as discussed below, a clustering algorithm is used to decide which stored model to replace. If the benefit module 940 decides that no replacement is necessary, the stored models are retained. If replacement is necessary, then the stored model marked for replacement by the benefit module 940 is replaced by with the current background model.

Frame Processing Module Operation

In general, the frame processing module 340 provides accurate and instantaneous background model adaptation to an image sequence that has undergone a major change and is not adequately represented by the current background model. The frame processing module retains a set of stored background models and, when this major change occurs, determines whether one of the stored background models is a better background model than the current background model. If so, then the best stored model is substituted for the current background model. If not, then the current background model is retained.

Figure 10A:
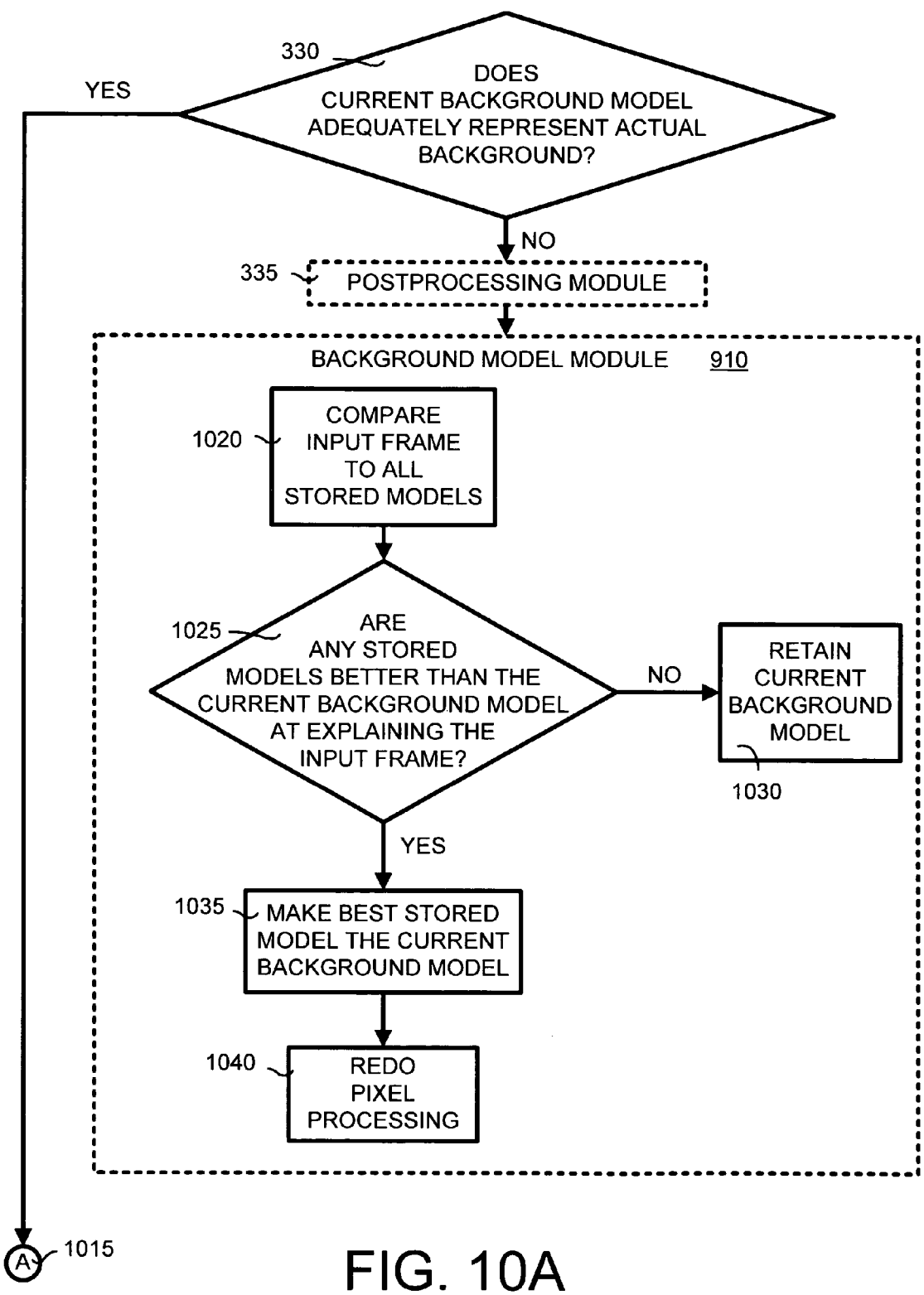
FIG. 10A is a detailed flow diagram illustrating the background model module of FIG. 9.
Figure 10B:
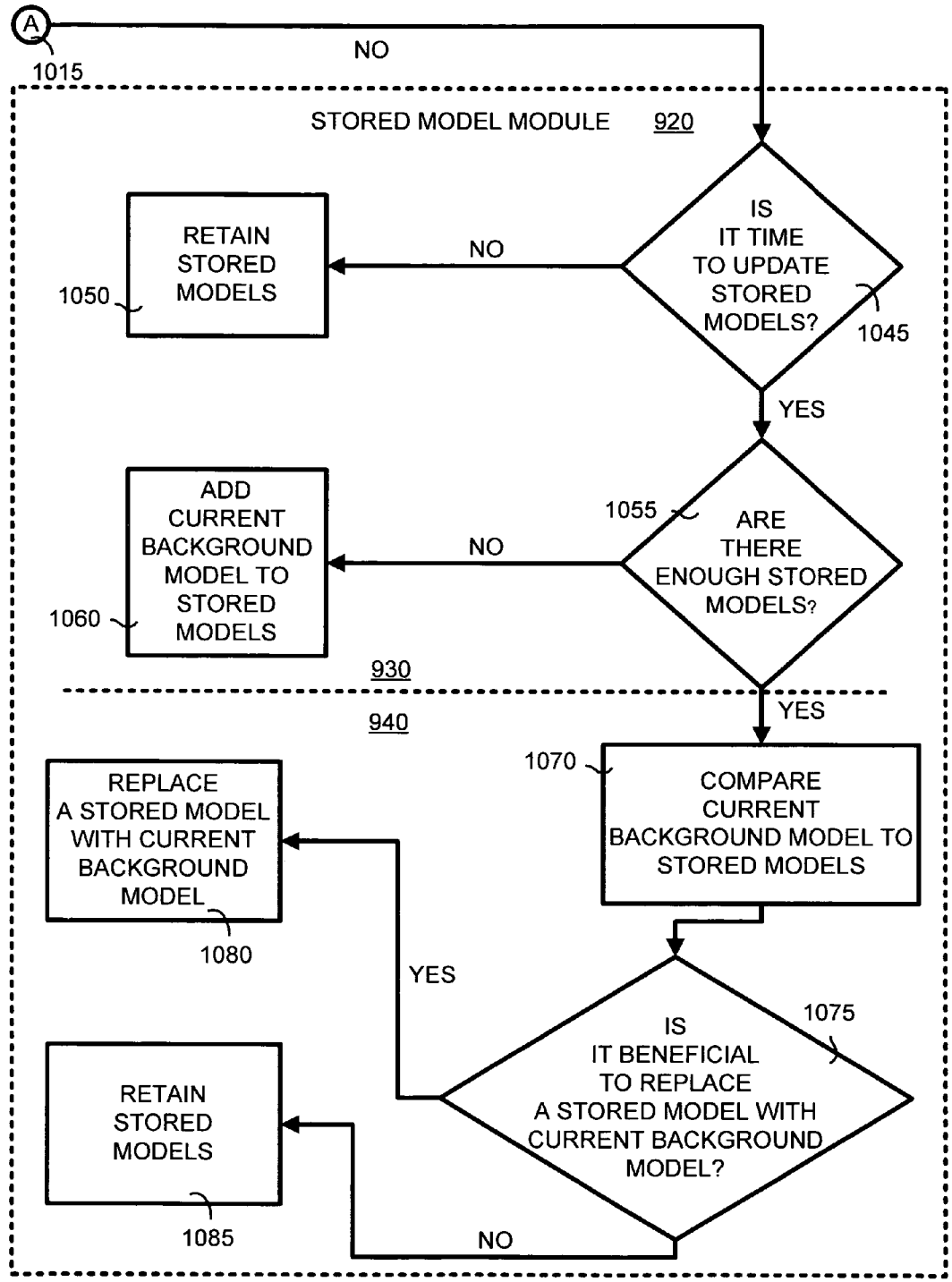
FIG. 10B is a detailed flow diagram illustrating the stored model module of FIG. 9.

FIGS. 10A and 10B are detailed flow diagrams illustrating the operation of the modules shown in FIG. 9, namely, the background model module 910 and the stored model module 920. The operation of each of these modules will now be discussed.

Background Model Module

Referring to FIG. 10A, the background model module 910 determines whether the current background model should be kept or replaced. Initially, as discussed above in conjunction with FIG. 3, the input frame is examined to determine whether the actual background is adequately represented by the current background model (box 330). If the actual background is adequately represented, then the input frame is sent to the stored model module (box 1015). Otherwise, after possibly undergoing postprocessing (box 335), the input frame is sent to the background model module 910. In a preferred embodiment, each input frame has had an initial pixel classification performed on a pixel scale and has been assigned a current background model prior to entering the frame processing module 340.

The input frame is received by the background model module 910 and compared to all stored background models (box 1020). This comparison is performed to determine whether any of the stored models are better than the current background model at explaining the input frame (box 1025). This means the comparison determines whether any of the stored models are a more accurate representation of the actual background than the current background model. Preferably, the comparison test used defines the best background model as the model with the lowest percentage of foreground pixels. Several other tests are possible and are known to those skilled in the art.

If the comparison test determines that that current background model is the most accurate, then the current background model is retained (box 1030). Conversely, if the current background model is not the best model, then the stored model that is the most accurate is substituted for the current background model (box 1035). In other words, the stored model becomes the new background model while the current background model is discarded. There is no need to keep the current background model because, as discussed below, the decision whether to save the model is handled in the stored model module 920. Further, the pixel processing is redone on the input frame with the new background model (box 1040).

Stored Model Module

The stored model module 920 determines if and when a stored model should be replaced and which of the stored models is replaced. Referring to FIG. 10B, the stored model module 920 includes a frequency module 930, which determines when a stored model should be added or replaced, and a benefit module 940, which determines if it is beneficial for the stored models to be replaced. The separation between these two modules is shown in FIG. 10B by a horizontal dashed line.

The input frame is received by the stored model module 920 and sent to the frequency module 930 (box 1015). The frequency module 930 determines whether it is time to update the stored models (box 1045). In a preferred embodiment, the update frequency is determined by some percentage of the number of frames required for pixel to regain stationarity and become part of the background. For example, when observing an office scene, a number of frames are selected such that the time spanned by those frames is approximately 10 seconds. At 5 Hz, this implies about 50 frames. Various other update frequencies may be used and are known to those skilled in the art. The frequency module 930 ensures that the expensive computation performed by the benefit module 940 (i.e. comparing the current background model to all of the stored models) is only performed occasionally in order to preserve system resources.

In addition, it is possible to perform this comparison a single bit at a time as each frame arrives so that the computation is spread over several frames. Of course, this reduces the quality of the comparisons, but should still be adequate. This technique would reduce the overall system cycle time.

If the frequency module 930 determines that it is not time to update the stored models, then the stored models are retained (box 1050) and the benefit module 940 is bypassed. If, however, the frequency module 930 determines that it is time to update, the module then determines whether there are enough stored models (box 1055). Usually, there are not enough stored models at system start-up and the frame processing module 340 will need to add models in order to achieve a maximally diverse set of stored models. If there are not enough models, the current background model is added to the stored models (box 1060). Otherwise, the process goes to the benefit module 940.

The benefit module 940 initially compares the current background model with all the stored models (box 1070). The goal of the benefit module is to maintain a maximally diverse set of stored models that may be used for substitution. Next, the benefit module 940 decides whether it is beneficial to replace one of the stored models with the current background model and, if so, which stored model should be replaced (box 1075). Several different clustering techniques may be used in this decision. In a preferred embodiment, a distance metric is used to determine how close any two models are to each other. The closest pair of stored models is selected and, if that pair does not contain the current background model, the stored model that is on average the closest to all other models is replaced with the current background model. Several clustering techniques that are known to those skilled in the art may be used instead.

If a stored background model should be replaced, then stored model selected for replacement by the above technique is replaced with the current background model (box 1080). Otherwise, the stored models are retained (box 1085).

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. An image background maintenance system for processing an image sequence having a plurality of temporally sequential frames, a current frame of the plurality of temporally sequential frames containing a pixel, comprising:
   a computation module that stores lists of at least two types of past values of the pixel to generate lists of past pixel values for the pixel in previous frames of the plurality of temporally sequential frames, the previous frames being earlier in time than the current frame;
   a prediction module that determines an actual value of the pixel in the current frame and uses the lists of at least two types of past values to make a first prediction of a subsequent pixel value and a second prediction of a subsequent pixel value for the pixel in the current frame; and
   a declaration module that classifies the pixel by comparing the at least two predictions of subsequent values to the actual value of the pixel.

2. The image background maintenance system of claim 1, wherein the computation module stores a list of predicted past pixel values and a list of actual past pixel values of the pixel in previous frames.

3. The image background maintenance system of claim 2, wherein the prediction module further comprises:
   an actual prediction module that predicts the first subsequent pixel value based on the list of actual past pixel values; and
   a predicted prediction module that predicts the second subsequent pixel value based on the list of predicted cast pixel values.

4. The image background maintenance system of claim 3, further comprising an update module that determines which of the first subsequent pixel value and the second subsequent pixel value has a least amount of error to obtain a best prediction and appends this best prediction to the list of predicted past pixel values.

5. The image background maintenance system of claim 4, wherein the prediction module uses a prediction technique having prediction coefficients that are computed using the list of actual past pixel values and the actual pixel value.

6. The image background maintenance system of claim 5, further comprising a recomputation module that computes an expected squared prediction error using the prediction coefficients and the list of actual past pixel values.

7. The image background maintenance system of claim 1, wherein
   the declaration module classifies the pixel as either a background pixel or a foreground pixel to separate the current frame into a foreground image containing foreground pixels and a background image containing background pixels.

8. A tangible computer-readable medium having stored and encoded thereon computer-executable modules, comprising:
   a computation module that supplies lists of past pixel values of a pixel contained in an image, the lists of past pixel values comprising a list of actual past pixel values of the pixel in previous frames of the image and a list of predicted past pixel values of the pixel in previous frames of the image;
   a prediction module that predicts for a current frame of the image at least: (a) a first subsequent value for the pixel using the list of predicted past pixel values; and (b) a second subsequent value for the pixel using the list of actual past pixel values; and
   a declaration module that classifies the pixel by comparing at least one of the first and the second subsequent pixel values to an actual value of the pixel in the current frame.

9. The computer-readable medium of claim 8, further comprising an update module that decides which of the first and the second subsequent pixel values has the least error and includes this best prediction in the list of predicted past pixel values.

10. The computer-readable medium of claim 8, wherein the prediction module uses a prediction technique having prediction parameters to predict the first and the second subsequent pixel values.

11. The computer-readable medium of claim 10, further comprising a recomputation module that recalculates at least some of the prediction parameters to form new prediction parameters.

12. The computer-readable medium of claim 10, wherein the prediction parameters are recalculated using the actual pixel value and the list actual past values of the pixel.

13. The computer-readable medium of claim 12, wherein:
   the declaration module classifies the pixel as either a background pixel or a foreground pixel; and
   the recomputation module is capable of replacing the prediction parameters with the new prediction parameters.

14. A method of processing an image sequence having a plurality of temporally sequential frames, each frame of the plurality of temporally sequential frames containing a pixel, comprising:
   storing previous values of the pixel obtained from previous frames in the plurality of temporally sequential frames, where the previous frames are earlier in time than a current frame containing the pixel;
   predicting, in a frame immediately prior in time to the current frame, at least two subsequent values of the pixel in the current frame using the previous values;
   determining an actual value of the pixel in the current frame; and comparing the actual pixel value with at least one of the two predicted pixel values so as to classify the pixel.

15. The method of claim 14, wherein storing further comprises storing both of: (a) actual past pixel values; and (b) predicted past pixel values.

16. The method of claim 15, wherein the two subsequent pixel values comprise: (a) an actual subsequent pixel value; (b) a predicted subsequent pixel value.

17. The method of claim 16, wherein:
the actual subsequent pixel value is calculated from the actual past pixel values; and
the predicted subsequent pixel value is calculated from the predicted past pixel values.

18. The method of claim 16, wherein comparing further comprises comparing the actual pixel value to both the actual subsequent pixel value and the predicted subsequent pixel value.

19. The method of claim 16, further comprising finding a subsequent pixel value closest in value to the actual pixel value to generate a best prediction and adding this best prediction to the predicted past pixel values.

* * * * *

UNITED STATES PATENT AND TRADEMARK OFFICE
CERTIFICATE OF CORRECTION

| | |
|---|---|
| PATENT NO. | : 7,489,817 B2 |
| APPLICATION NO. | : 11/255447 |
| DATED | : February 10, 2009 |
| INVENTOR(S) | : Kentaro Toyama et al. |

It is certified that error appears in the above-identified patent and that said Letters Patent is hereby corrected as shown below:

In column 21, line 60, in Claim 3, delete "cast" and insert -- past --, therefor.

In column 22, line 49, in Claim 12, delete "list" and insert -- list of --, therefor.

Signed and Sealed this
Third Day of May, 2011

David J. Kappos
*Director of the United States Patent and Trademark Office*